(12) United States Patent
Erven

(10) Patent No.: US 11,979,015 B2
(45) Date of Patent: May 7, 2024

(54) CIRCUIT BREAKER DEVICE, CIRCUIT BREAKER SYSTEM AND METHOD

(71) Applicant: Siemens Aktiengesellschaft, Munich (DE)

(72) Inventor: Wolfgang Erven, Amberg (DE)

(73) Assignee: Siemens Aktiengesellschaft, Munich (DE)

( * ) Notice: Subject to any disclaimer, the term of this patent is extended or adjusted under 35 U.S.C. 154(b) by 200 days.

(21) Appl. No.: 17/640,052

(22) PCT Filed: Jul. 22, 2020

(86) PCT No.: PCT/EP2020/070672
§ 371 (c)(1),
(2) Date: Mar. 3, 2022

(87) PCT Pub. No.: WO2021/043497
PCT Pub. Date: Mar. 11, 2021

(65) Prior Publication Data
US 2022/0337046 A1    Oct. 20, 2022

(30) Foreign Application Priority Data

Sep. 6, 2019  (DE) .................. 10 2019 213 604.4

(51) Int. Cl.
*H02H 3/08*    (2006.01)
*H01H 69/00*   (2006.01)
*H01H 71/12*   (2006.01)
*H01H 71/24*   (2006.01)
*H02H 1/00*    (2006.01)

(52) U.S. Cl.
CPC .............. *H02H 3/08* (2013.01); *H01H 69/00* (2013.01); *H01H 71/125* (2013.01); *H01H 71/24* (2013.01); *H02H 1/0007* (2013.01)

(58) Field of Classification Search
CPC ...... H02H 1/0007; H02H 3/021; H02H 3/033; H02H 3/08; H02H 3/33; H01H 71/125; H01H 71/24; H01H 2071/124; H01H 69/00; H01H 9/548
USPC .......................................................... 361/87
See application file for complete search history.

(56) References Cited

U.S. PATENT DOCUMENTS

| 2012/0007657 A1 | 1/2012 | Naumann et al. |
| 2012/0106021 A1 | 5/2012 | Suchoff |
| 2015/0055260 A1 | 2/2015 | Tekletsadik et al. |

(Continued)

FOREIGN PATENT DOCUMENTS

| CN | 1395346 A   | 2/2003 |
| CN | 102349124 A | 2/2012 |

(Continued)

OTHER PUBLICATIONS

Machine translation of Schmid et al. German Patent Document DE 19944043 A1 Mar. 2001 (Year: 2001).*

(Continued)

*Primary Examiner* — Kevin J Comber
(74) *Attorney, Agent, or Firm* — Harness, Dickey & Pierce, P.L.C.

(57) ABSTRACT

A circuit breaker device or circuit breaker system may include a series connection of a semiconductor switch and an isolating contact system, for a low voltage electrical circuit, in which the magnitude of the current is determined.

22 Claims, 1 Drawing Sheet

(56) References Cited

U.S. PATENT DOCUMENTS

| | | | |
|---|---|---|---|
| 2016/0118212 A1 | 4/2016 | Veil et al. | |
| 2016/0294179 A1* | 10/2016 | Kennedy | H02H 7/261 |
| 2017/0256934 A1* | 9/2017 | Kennedy | H02H 3/382 |
| 2018/0205262 A1 | 7/2018 | Akita et al. | |
| 2019/0103742 A1* | 4/2019 | Kennedy | H01H 89/00 |
| 2020/0328038 A1 | 10/2020 | Schmitz et al. | |

FOREIGN PATENT DOCUMENTS

| | | | | |
|---|---|---|---|---|
| CN | 103415905 A | 11/2013 | | |
| CN | 105393175 A | 3/2016 | | |
| CN | 105594084 A | 5/2016 | | |
| CN | 108885952 A | 11/2018 | | |
| DE | 19944043 A1 * | 3/2001 | | H01H 9/548 |
| DE | 19944043 A1 | 3/2001 | | |
| DE | 102006025604 A1 | 11/2007 | | |
| DE | 202016006183 U1 | 1/2018 | | |
| JP | 2017060317 A | 3/2017 | | |

OTHER PUBLICATIONS

PCT International Search Report and Written Opinion of International Searching Authority dated Oct. 15, 2020 corresponding to PCT International Application No. PCT/EP2020/070672 filed Jul. 22, 2020.

Ling Bangguo et al:"Design and Application of Low Voltage Composite Switches", Science & Technology Vision, No. 32, DOI:10. 19694/j.cnki.issn2095-2457.2013.32.084, p. 109, Nov. 15, 2013.

* cited by examiner

CIRCUIT BREAKER DEVICE, CIRCUIT BREAKER SYSTEM AND METHOD

CROSS-REFERENCE TO RELATED APPLICATION(S)

This application is the National Phase under 35 U.S.C. § 371 of International Application No. PCT/EP2020/070672, which has an international filing date of Jul. 22, 2020, and which designated the United States of America and which claims priority to German patent application numbers DE 102019213604.4 filed Sep. 6, 2019, the entire contents of which are incorporated herein by reference.

FIELD

Example embodiments generally relate to a circuit breaker device for interrupting a low-voltage circuit having a plurality of conductors, to a circuit breaker system for interrupting a low-voltage circuit having a plurality of conductors and to a method for a circuit breaker device or a circuit breaker system for interrupting a low-voltage circuit having a plurality of conductors.

BACKGROUND

Until now, various circuit breaker devices for low-voltage circuits have been known.

Low voltage is meant to refer to voltages up to 1000 volts AC or 1500 volts DC. Low voltage is meant to refer in particular to voltages that are greater than extra-low voltage, with values of 50 volts AC or 120 volts DC.

Circuits, in particular for low voltage, is meant to refer to circuits for currents up to 6300 amperes, more specifically currents up to 1600 amperes, 1200 amperes, 630 amperes, 125 amperes, 80 amperes, 63 amperes, 40 amperes, 25 amperes or 16 amperes. The current values mentioned are meant to refer in particular to rated or/and switch-off currents, that is to say the maximum current that is usually fed via the circuit or the current at which the electric circuit is usually interrupted, for example by way of a switching device or a circuit breaker device.

Conventional switching devices or circuit breaker devices for low-voltage circuits within the context of example embodiments are for example (load) isolating switches, circuit breakers, residual current circuit breakers or miniature circuit breakers.

Isolators or isolator switches are electrical actuation systems designed to electrically isolate electrical low-voltage circuits or (parts of) systems in a load-free (currentless) manner. Electrical isolation under load is not possible or only possible to a restricted extent by conventional isolators and may lead to an arc arising during isolation that destroys the isolator.

Load isolators or load isolator switches are electrical actuation systems designed to electrically isolate electrical low-voltage circuits or (parts of) systems under load. For this purpose, load isolators comprise for example an arc quenching device, by which an arc arising during electrical isolation under load is able to be led away by switching elements of the load isolator and quenched in a heat-resistant section of the arc quenching device, such as an arc quenching chamber, for example. In this way, thermal overloading of sensitive components of the load isolator that are caused by the arc is prevented.

One particular embodiment of isolators or load isolators is load isolators with fuses, such as fused load isolators or fused load isolator switches. Fused load isolators are load isolators comprising an electrical fuse, such as a safety fuse, for example what is known as an NH fuse.

Isolator switches or load isolator switches are actuated manually, for example by way of a handle, for example in the form of a lever/handle that opens contacts of the circuit so that electrical isolation, in particular using an isolating gap or protection gap, is implemented. The lever in this case is used as a switching position indication that for example there is a non-energized state present in the downstream low-voltage circuit.

An interruption in the case of short circuits, in particular a repeated short circuit, is not provided in isolator switches or load isolator switches. Nevertheless, switching onto a short circuit is permitted in the case of isolator switches or load isolator switches.

In contrast to this, circuit breakers, miniature circuit breakers and residual current circuit breakers are known. The interruption of the circuit is carried out here automatically when certain overcurrent conditions, short-circuit conditions or residual current conditions are present. After an interruption, these devices can be switched on again relatively quickly. Manual switching off is likewise provided.

Circuit breakers and miniature circuit breakers are circuit breaker devices that function in a similar manner to a fuse. Circuit breakers monitor the current flowing through them by at least one conductor and interrupt the electric current or flow of energy to a heatsink or a consumer, which is referred to as tripping when protection parameters, such as current limit values, are exceeded. The interruption of the low-voltage circuit occurs here in a mechanical way through the opening of mechanical contacts.

SUMMARY

Example embodiments relate to switching devices with an isolating function, which is implemented by way of an isolating contact system. The term isolating function is meant to refer to a certain minimum distance or minimum clearance between the contacts of the isolating contact system. This minimum clearance is essentially dependent on voltage. Further parameters are the degree of soiling, the type of field (homogeneous, nonhomogeneous) and the air pressure or the height above mean sea level.

These minimum clearances or creepage distances are subject to corresponding regulations or standards. These regulations specify, for example for a surge voltage resistance in the case of air, the minimum clearance for a nonhomogeneous and for a homogeneous (ideal) electrical field as a function of the degree of soiling. The surge voltage resistance is the resistance when a corresponding surge voltage is applied. The isolating contact system or the circuit breaker device has an isolating function (isolating property) only when this minimum distance (minimum clearance) is present.

According to example embodiments, in this context the series of standards DIN EN 60947 and IEC 60947 are relevant for the isolating function and its properties, and reference is made to these here.

If semiconductor switching elements are intended to be used for low-voltage circuits, however, further safety measures must be met in order to enable a standards-compliant electrical system to be operated. Semiconductor switching element is meant to refer to a component, such as a transistor, IGBT, MOSFET, etc. via which the actual current flows or the actual switching element. Semiconductor switch is meant to refer to a semiconductor switching element, that is to say a component with (additional) circuitry that is conventional or required for the function thereof. That is to say it could comprise for example two terminals for the actual flow of current and one or more terminals for the initiation of the switching function. Semiconductor switches are usually designed in combination (series circuit) with circuit breakers and (load) isolator switches. The semiconductor switches ensure rapid interruption of the circuit but cannot provide electrical isolation because they have a high impedance only in the switched-off state.

The circuit breaker is used for the purpose of protection in the event of a failure of a semiconductor switch. The (load) isolator switch is actuated manually in order to make reliable isolation possible, for example in the case of repair. To this end, said switch is switched on and off locally. This concept is complex and impractical to operate.

Example embodiments improve existing circuit breaker devices or circuit breaker functions, in particular providing a novel circuit breaker device using modern semiconductor switches with an isolating function.

Example embodiments include a circuit breaker device having the features of patent claim 1, a circuit breaker system having the features of patent claim 17, devices for a circuit breaker system having the features of patent claim 20 and 21 respectively, and a method for a circuit breaker device or circuit breaker system having the features of patent claim 22.

At least one example embodiment provides a circuit breaker device for a low-voltage circuit comprising a plurality of conductors, wherein the circuit breaker device comprises in a housing:
- input-side first conductor connections for the low-voltage circuit, which are connected to output-side second conductor connections via a series circuit composed of an isolating contact system and a semiconductor switch, wherein a respective input-side conductor connection is connected to an output-side conductor connection, one isolating contact and one semiconductor switch subunit of the semiconductor switch is provided per connector (conductor), (the conductor connections are configured in such a way that conductors of the low-voltage circuit can be connected to the housing),
- a drive and an accessible (mechanical) handle for the isolating contact system on the housing,
- an (optical) display unit and an operating unit on the housing,
- a current sensor, which determines the level of the current of the low-voltage circuit; for example, one current sensor can be provided per phase in the case of a multiconductor system, such as a three-phase AC circuit,
- a control unit, which is connected to the current sensor(s), the display unit, the operating unit, the drive of the isolating contact system and the semiconductor switch and which is configured in such a way that:
  - in a switch-on process, first the isolating contact system is closed and then the semiconductor switch becomes low-impedance,
  - in a manual first switch-off process, the semiconductor switch becomes high-impedance and the isolating contact system remains closed,
  - in the case of a determined current that exceeds a first current threshold value for a first time period, according to the first switch-off process, the semiconductor switch becomes high-impedance and the isolating contact system remains closed,
  - in the case of a determined current that exceeds a (higher) second current threshold value for a second time period, for a second switch-off process, the semiconductor switch becomes high-impedance and then the isolating contact system is opened,
  - in the case of a determined current that exceeds an (even higher) third current threshold value, according to the second switch-off process, the semiconductor switch becomes high-impedance and then the isolating contact system is opened.

The semiconductor switch and the isolating contact system, that is to say the isolating function or the isolator, advantageously constitute a circuit breaker device or a circuit breaker system/switching device combination that is capable of switching both electronically by semiconductor switches and mechanically by way of the isolator. According to at least one example embodiment, the isolator, that is to say the isolating contact system, for this purpose has a drive, for example a motor drive. The semiconductor switch switches electronically and the isolating contact system is activated only when a reliable electrical isolation is required, for example in the case of a critical fault (second or third current limit value exceeded) or manually in the case of a service. A standards-compliant display of the electrical isolation is ensured by the handle.

Advantageous configurations of example embodiments are specified in the dependent claims.

In one advantageous configuration of at least one example embodiment, in a second switch-off process, the open isolating contact system is locked by a first locking procedure.

This has the particular advantage that the isolating contact system is locked internally and thus is not able to be switched on again before the fault has been eliminated or thus there is a clear signal that there is a critical fault so that the isolating contact system cannot readily be switched on again.

In one advantageous configuration of at least one example embodiment, an unlocking procedure of the first locking procedure of the isolating contact system can be performed only when the semiconductor switch is high-impedance.

This has the particular advantage that switching onto a current is prevented, which increases safety. In addition, in the case of a high impedance, the switching power is greatly minimized, which makes it possible to construct the isolating contact system in a simpler manner.

In at least one example embodiment, in a switch-on process, after the semiconductor switch has become low-impedance, a second locking procedure prevents manual opening of the isolating contact system.

This has the particular advantage that (manual) isolation in the event of a current flow is prevented, with the result that it is possible to construct the isolating contact system in a simple manner.

In at least one example embodiment, opening of the isolating contact system can be performed only when the semiconductor switch is high-impedance.

This has the particular advantage that switching or opening of the isolating contact system with a flow of current, for example so as to produce an arc, is prevented and thus it is once more possible to construct the isolating contact system in a simple manner.

In at least one example embodiment, it is possible to perform a differential current determination in the low-voltage circuit. A second switch-off process is carried out in the case of a differential current value that exceeds a residual current threshold value (differential current threshold value).

This has the particular advantage that electrical isolation is carried out in the presence of a residual current that is dangerous to people.

In at least one example embodiment, a switch-on and switch-off process can be initiated by the operating unit.

This has the particular advantage that simple switch-on and switch-off is made possible.

In at least one example embodiment, the display unit displays the switching state of the semiconductor switch or/and the type of switch-off process.

This has the particular advantage that clear visualization of the (switching) state is provided.

In at least one example embodiment, the handle displays the state of the isolating contact system.

This has the particular advantage that clear identification of the isolating function is provided.

In at least one example embodiment, the display unit also displays the state of the isolating contact system.

This has the particular advantage that an integrated display of all states is provided.

In at least one example embodiment, the drive is a motor drive or solenoid drive or comprises a spring energy store.

This has the particular advantage that the mechanical isolating contact system is capable of remote switching and can thus have a functional interaction with the semiconductor switch.

In at least one example embodiment, a communication interface is provided. Said communication interface is connected for example to the control unit.

This has the particular advantage that monitoring or control of the circuit breaker device that can be operated remotely is made possible. Furthermore, for example, coupling to other circuit breaker devices or devices.

In at least one example embodiment, a voltage sensor for determining the level of the voltage of the low-voltage circuit is provided, which voltage sensor is connected in particular to the control unit.

This has the particular advantage that further protection functions, such as overvoltage or undervoltage protection, are made possible.

In at least one example embodiment, a power supply unit is provided, one side of which draws energy from the low-voltage circuit and the other side of which is connected to the control unit.

This has the particular advantage that self-supply of the circuit breaker device is provided.

In at least one example embodiment, an auxiliary voltage connection is provided in particular in order to supply energy to the control unit.

This has the particular advantage that an external energy supply to the circuit breaker device, which is independent of the voltage or the current flow of the low-voltage circuit, and thus to the protection functions is provided.

In at least one example embodiment, the display unit is an optical display unit, which comprises in particular light-emitting diodes.

This has the particular advantage that simple and good visualization is provided.

In at least one example embodiment, the handle is a mechanical handle for the isolating contact system.

This has the particular advantage that simple and optically easily visible implementation of the clear identification of the isolating function is provided.

In at least one example embodiment, a pyrotechnic fuse is provided, which is connected in series with the series circuit and is tripped in the case of a flow of current that exceeds a fourth current threshold value and in the case of a high-impedance switching state of the semiconductor switch, with the result that the low-voltage circuit is interrupted.

This has the particular advantage that protection is provided in the case of complete galvanization of the semiconductor switch, in particular when rapid reaction times are required for the purpose of protection.

At least one example embodiment also provides a corresponding circuit breaker system for a low-voltage circuit, with the difference that two devices that are connected to one another via a communication link are provided. The first device comprises a semiconductor switch. The second device comprises an isolating contact system.

The system or the first/second device can be provided with individual advantageous configurations or all of the advantageous configurations mentioned above and below.

In one advantageous configuration of the system, the communication link is a wired communication link.

This has the particular advantage that a particularly reliable link is provided, which makes it possible to reliably provide the protection functions.

At least one example embodiment provides a corresponding method for a circuit breaker device or circuit breaker system. The method may comprise individual advantageous configurations or all of the advantageous configurations mentioned above and below.

All the refinements, both referred back in a dependent form to the independent patent claims and referred back only to individual features or combinations of features of patent claims, bring about an improvement in the novel circuit breaker device, circuit breaker system, individual device or method.

BRIEF DESCRIPTION OF THE DRAWINGS

The described properties, features and advantages of example embodiments as well as the way in which they are achieved become clearer and more readily understandable in conjunction with the following description of example embodiments and are explained in more detail in conjunction with the drawings.

In the associated drawings.

DETAILED DESCRIPTION

Figure 1:
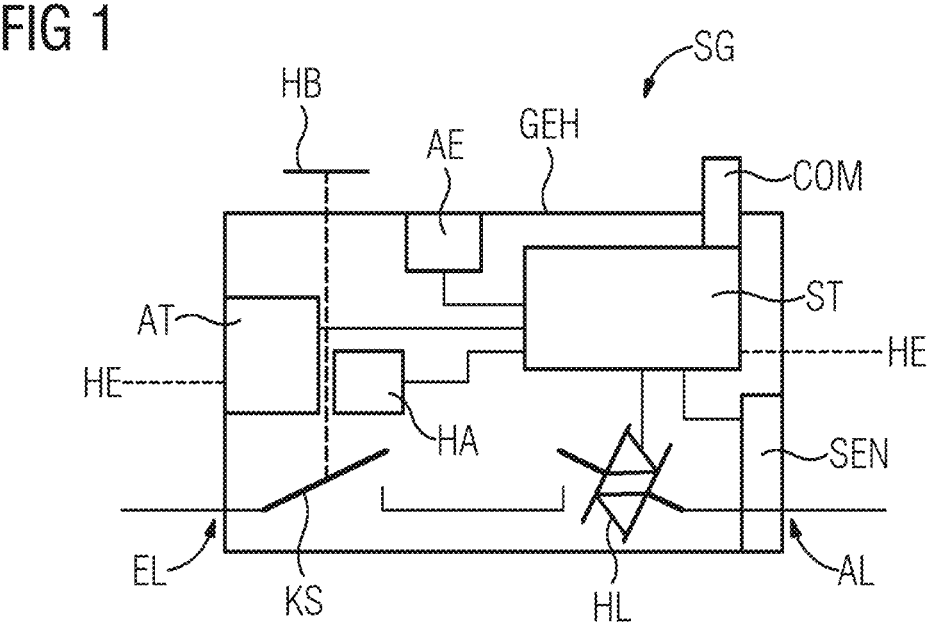
FIG. 1 shows a circuit breaker device according to at least one example embodiment.

FIG. 1 shows a circuit breaker device SG for a low-voltage circuit, such as for example a three-phase AC circuit with three phase conductors and a neutral conductor, or a single-phase AC circuit with phase and neutral conductors, comprising a housing GEH. The circuit breaker device SG comprises input-side first conductor connections EL for the low-voltage circuit, which are connected to output-side second conductor connections AL via a series circuit composed of an isolating contact system KS and a semiconductor switch HL, wherein a respective input-side conductor connection EL is connected to an output-side conductor connection AL. One isolating contact of the isolating contact system KS and one semiconductor switch subunit of the semiconductor switch HL is provided per connector (conductor). In the example according to FIG. 1, only one conductor is illustrated. The conductor connections can be configured in such a way that conductors of the low-voltage circuit can be connected to the housing.

According to at least one example embodiment, the isolating contact system KS comprises a drive AT, for example a motor drive or solenoid drive, and a (mechanical) handle HB on the housing GEH, which is accessible (from the outside) and which, in addition to the possible actuation of the isolating contact system, is used as a display for the switching position of the isolating contact system KS (switching position display).

An (optical) display unit AE, in particular for displaying the state or the switching position of the semiconductor switch HL, and an operating unit are provided on the housing GEH—in the example, the display unit AE comprises an integrated operating unit. A current sensor SEN for the conductor is provided in the housing GEH, said current sensor determining the level of the current of the low-voltage circuit; for example, one current sensor SEN can be provided per phase (or when necessary in addition for the neutral conductor) in a multiconductor system, such as a three-phase AC circuit. A voltage sensor can also be provided. A control unit ST, which is connected to the current sensor(s) SEN, the display unit AE (in conjunction with the operating unit), the drive AT of the isolating contact system KS and the semiconductor switch HL, is provided in the housing. A communication interface COM can also be provided, which is likewise connected to the control unit ST. The isolating contact system KS or the drive AT can also comprise an auxiliary trip switch HA, which is likewise connected to the control unit ST. The auxiliary trip switch (auxiliary trip system) HA is used to actuate the drive when it is configured as a spring energy store and thus requires auxiliary energy for actuation.

A power supply unit for supplying energy to the control unit ST can be provided in the circuit breaker device SG. As an alternative or in addition, one (or more) auxiliary energy connection(s) HE (auxiliary voltage connection) can be provided.

According to at least one example embodiment, a pyrotechnic fuse can also be provided, which is provided in the series circuit composed of the isolating contact system KS and the semiconductor switch HL (in front of, in the center, behind).

Figure 2:
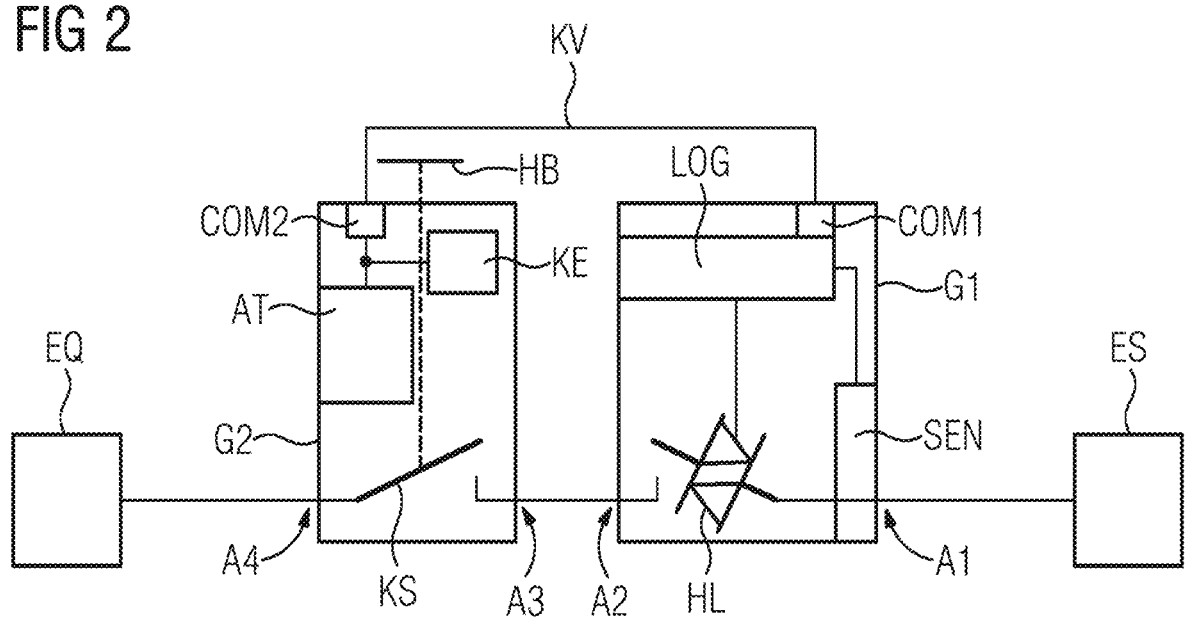
FIG. 2 shows a circuit breaker system according to at least one example embodiment.

FIG. 2 shows an arrangement according to FIG. 1, with the difference that the isolating contact system and the semiconductor switch are arranged in different devices with their own housings. FIG. 2 shows a corresponding circuit breaker system for a low-voltage circuit; in the example, an energy source EQ, which is connected to an energy sink ES (load, consumer, etc.) via the circuit breaker system, is shown. The circuit breaker system comprises a first device G1 comprising a semiconductor switch HL and a second device G2 comprising an isolating contact system KS, which devices are connected to one another via a communication link KV.

In a first device housing, the first device G1 has input-side first connections A1 for the low-voltage circuit, which are connected to output-side second connections A2 via the semiconductor switch HL, in a manner analogous to FIG. 1. A current sensor SEN, which determines the level of the current of the low-voltage circuit. A logic unit LOG, which is connected to the semiconductor switch HL and the current sensor SEN and which in turn is connected to a first communication interface COM1, which provides a connection for the communication link KV. The logic unit LOG is constructed in a manner analogous to the control unit SE and can have in particular only the functions that are required for the first device.

In a second device housing, the second device G2 analogously has input-side third connections A3 for the low-voltage circuit, which are connected to output-side fourth connections A4 via an isolating contact system KS. The second device analogously has a drive AT and an accessible handle HB on the housing for the isolating contact system KS. Furthermore, a monitoring unit KE, which can be of an analogous design to the control unit ST or logic unit LOG and in one configuration has only the functions that are required for the second device G2. The monitoring unit KE is connected to the drive AT of the isolating contact system KS and to a second communication interface COM2, which provides a connection for the communication link KV. A further embodiment of the second device G2 is a device housing comprising an isolating contact system KS, a drive AT with the accessible handle HB and an auxiliary trip switch HA. The auxiliary trip switch HA is connected to the first device G1 by a communication link (via which energy can also be transmitted, that is to say which can also provide energy).

In addition to the communication link KV, the second connections A2 are connected to the third connections A3 via a line of the low-voltage circuit.

The communication link KV may be in particular a wired communication link in order that reliable communication is ensured.

The first device G1 or/and the second device G2 can comprise a display unit or/and an operating unit, for example also as a combined display and operating unit, in order to save space. These are arranged on the respective device housing. They are also connected to the logic unit LOG or/and monitoring unit KE depending on the configuration.

Auxiliary trip switches, power supply units or/and auxiliary energy connections can also be provided, in a manner analogous to FIG. 1.

In one configuration, the (switching) state of the second device can be displayed on the first device. In an alternative or additional configuration, the (switching) state of the first device can be displayed on the second device.

According to at least one example embodiment, the novel circuit breaker device or circuit breaker system or method is configured in such a way that:

in a switch-on process, which can be initiated via the operating unit or by way of a signal via the communication interface COM, COM1, COM2, first the isolating contact system KS is closed and then the semiconductor switch HL becomes low-impedance. In a manual first switch-off process, which can be initiated via the operating unit or by way of a signal via the communication interface COM, COM1, COM2, the semiconductor switch HL becomes high-impedance and the isolating contact system KS remains closed. In the case of a current, determined by way of the current sensor SEN, that exceeds a first current threshold value for a first time period, according to the first switch-off process, the semiconductor switch HL becomes high-impedance and the isolating contact system KS remains closed. This can be implemented for example for the case of simple overcurrents above the measurement current. In the case of a current (determined by way of the current sensor SEN) that exceeds a second current threshold value (which is higher than the first current threshold value) for a second time period (which is equal to or greater than the first time period), for a second switch-off process, the semiconductor switch (HL) becomes high-impedance and then the isolating contact system (KS) is opened. This can be implemented for example for a critical case of overcurrents, wherein electrical isolation is performed. In the case of a determined current that exceeds a third current threshold value (higher than the second current threshold value), according to the second switch-off process, the semiconductor switch (HL) becomes high-impedance and then the isolating contact system (KS) is opened. This can be used for example in the case of a short circuit (short-circuit currents) in order to achieve rapid disconnection with electrical isolation.

In particular, in a second switch-off process, the open isolating contact system KS can be locked by a first locking procedure in order to prevent (unintended) switch-off after a critical overcurrent or short-circuit current.

In particular, an unlocking procedure of said first locking procedure of the isolating contact system can be performed only when the semiconductor switch is high-impedance, such that switch-on occurs in the (substantially) currentless case. This may be important for personal safety as well as for the service life of the isolating contact system KS.

In a switch-on process, after the semiconductor switch HL has become low-impedance, a second locking procedure can prevent manual opening of the isolating contact system, such that (unintended) opening of the isolating contact system under voltage/current is prevented, in which case arcs could arise.

In particular, opening of the isolating contact system can be performed only when the semiconductor switch is high-impedance.

The circuit breaker device can have a residual current function in which a differential current determination is performed in the low-voltage circuit. For example, by way of a summation current transducer or a differential value formation of measured conductor currents. In the case of a differential current value that exceeds a residual current threshold value (for example 30 mA for personal safety), a second switch-off process can be carried out so that electrical isolation is present for the purpose of personal safety.

A switch-on and switch-off process can be able to be initiated via the operating unit. The display unit can display the switching state of the semiconductor switch or/and the type of switch-off process. The handle displays the state of the isolating contact system. The display unit can also display the state of the isolating contact system. The display unit may be an optical display unit, for example comprising lamps, light-emitting diodes, segment displays, (touchscreen) display screens, etc.

Low-impedance is meant to refer to a state in which the permissible currents can flow. In particular, low-impedance is meant to refer to resistance values that are lower than 10 ohms, preferably lower than 1 ohm, 100 milliohms, 10 milliohms, 1 milliohm, 100 microohms, 10 microohms, 1 microohm, 100 nanohms, 10 nanohms, 1 nanohm or lower.

High-impedance is meant to refer to a state in which only a current with a negligible magnitude flows. In particular, high-impedance is meant to refer to resistance values that are greater than 1 kiloohm, preferably greater than 10 kiloohms, 100 kiloohms, 1 megaohm, 10 megaohms, 100 megaohms, 1 gigaohm, 10 gigaohms, 100 gigaohms, 1 teraohm or greater.

The semiconductor switch can advantageously be configured comprising bipolar transistors, field-effect transistors, thyristors or/and insulated-gate bipolar transistors (IGBTs).

The isolating contact system is advantageously characterized by a minimum clearance of the open isolating contacts in the OFF position (open position, open contacts) depending on the measurement surge voltage resistance and the degree of soiling. The minimum clearance is in particular between (at a minimum) 0.01 mm and 14 mm. In particular, the minimum clearance is advantageously between 0.01 mm at 0.33 kV and 14 mm at 12 kV, in particular for a degree of soiling of 1 and in particular for nonhomogeneous fields.

The minimum clearance can advantageously have the following values:
E DIN EN 60947-1 (VDE 0660-100):2018-06

TABLE 13

Minimum clearances

| Measurement surge voltage resistance $U_{imp}$ | Case A nonhomogeneous field (see 3.7.63) Degree of soiling | | | | Case B homogeneous field, ideal conditions (see 3.7.62) Degree of soiling | | | |
|---|---|---|---|---|---|---|---|---|
| kV | 1 | 2 | 3 | 4 | 1 | 2 | 3 | 4 |
| 0.33 | 0.01 | | | | 0.01 | | | |
| 0.5 | 0.04 | 0.2 | | | 0.04 | 0.2 | | |
| 0.8 | 0.1 | | 0.8 | | 0.1 | | 0.8 | 1.6 |
| 1.5 | 0.5 | 0.5 | | 1.6 | 0.3 | 0.3 | | |
| 2.5 | 1.5 | 1.5 | 1.5 | | 0.6 | 0.6 | | |
| 4.0 | 3 | 3 | 3 | 3 | 1.2 | 1.2 | 1.2 | |
| 6.0 | 5.5 | 5.5 | 5.5 | 5.5 | 2 | 2 | 2 | 2 |
| 8.0 | 8 | 8 | 8 | 8 | 3 | 3 | 3 | 3 |
| 12 | 14 | 14 | 14 | 14 | 4.5 | 4.5 | 4.5 | 4.5 |

NB: The specified smallest air gaps are based on the 1.2/50 µs surge voltage at an air pressure of 80 kPa, which corresponds to the air pressure at 2000 m above mean sea level.

The degrees of soiling and the types of field correspond to those defined in the standards. This has the advantage that a standards-compliant circuit breaker device that is dimensioned in accordance with the measurement surge voltage resistance can be obtained.

In the text which follows, at least one example embodiment will be explained once more in other words and its advantages illustrated.

A control unit ST (logic unit LOG, monitoring unit KE) in the circuit breaker device SG or system is used to ensure that the isolating contact system KS (the isolator) is opened only when a critical (indicated) failure is present and a reliable (electrical) isolation is required. To this end, the isolating contact system KS can be locked (first locking procedure) so that a switch-on (by way of a motor) of the isolating contact system KS is excluded (for example by way of a blocking signal to the motor drive). After a fault has been rectified, it is then possible to switch on again, for example by way of service personnel on site. In the case of manual (normal or operational) switching, the isolating contact system KS remains closed (ON). Only the semiconductor switch HL interrupts the current. A critical/indicated failure is for example a short circuit (third current threshold value) or a critical overcurrent (second current threshold value, second time period) defined for the installation.

An interconnection can also be provided, which ensures that the isolating contact system KS is closed upstream of the flow of current. That is to say that before the semiconductor switch HL can become low-impedance, the isolating contact system KS must be closed. The rated and overcurrents being switched is thus intended to be prevented, such that the closure of the contacts of the isolating contact system KS is prevented.

The isolating contact system KS is to be dimensioned in such a way that it is reliably kept shut up to the defined overcurrent. The (motor) drive drives the isolating contact system KS directly or indirectly. It may thus be possible to perform actuation remotely, via a communication interface COM. By way of example, a direct drive AT of the switching axis of the isolating contact system KS can be realized. It is also possible to provide a trip spring energy store, which is charged.

The switching position display of the isolating contact system KS can be constructed in such a way that it also displays the (switching) state of the semiconductor switch HL in addition to the state of the isolating contact system KS. To this end, a small mechanical switch can be provided, which moves a marking "on/off". It is thus possible for example for service personnel to clearly identify the (switching) state of the circuit breaker device SG and the conductor path/load path thereof, even for the case where no current is flowing in the low-voltage circuit.

A locking procedure can be provided, whereby the isolating contact system KS cannot be switched on when the semiconductor switch HL is not high-impedance (OFF).

The isolating contact system KS can also comprise a (tensible) toggle lever latching mechanism. In this case, the tripping can be carried out by an auxiliary trip switch (for example a voltage trip switch), which unlatches the tensioned latching mechanism. The switch-on can be carried out on site by way of manual actuation.

In comparison with the circuit breaker system, the circuit breaker device has the advantage that complex circuitry between the devices is avoided.

The circuit breaker device can be provided with a further isolating apparatus. This could be implemented by way of a pyrotechnic switch that is connected in series. For the protection of converters, in the event of a fault, an (ultra-rapid) disconnection is required, which is normally realized by way of the semiconductor switch HL. However, if the semiconductor shorts, that is to say current flows, although the semiconductor switch HL is (or should be) actually high-impedance (off), in this fault case an (ultra-rapid) disconnection is possible using the further isolating apparatus, for example pyrotechnic switch. For example, when the current (for the high-impedance case) exceeds a fourth current threshold value.

At least one example embodiment consists inter alia in redefining two previous functional modules. In the field of conventional electromechanical switches, there was a circuit breaker that could ensure isolation with a clear switching position display. An additional isolator comprising an isolating contact system KS in the current path was provided for repair purposes.

If the intention now is to perform switching electronically (using a semiconductor switch HL), the semiconductor switch HL uses (its) control to take on the protective function; the isolator is responsible only for the reliable isolation by way of an isolating contact system KS. The previous functional relationship in a circuit breaker, of the switching and reliable isolation and clear switching position display, is thus no longer achievable.

According to at least one example embodiment, the functions are also redistributed over one or two devices:

1. The semiconductor switch takes on the function of switching and protection (including signal acquisition and processing) and is the master for the isolating contact system KS/the isolator when OFF is switched.
2. The isolator/the isolating contact system KS takes on the function of electrical isolation and clear switching position display. However, this function is not carried out for each switching process but only when the semiconductor switch HL reports a qualified (critical) fault. The semiconductor switch HL only takes on normal operational switching. The isolator/the isolating contact system KS is provided according to at least one example embodiment with a (motor) drive, which can also perform remote switch-on. The master when switching ON (again) after a critical fault is the isolator/the isolating contact system KS.

Initial state of the method: circuit is interrupted, isolator is open/OFF, semiconductor switch is high-impedance.

1. Switch-on: switch on signal at isolator (comes from installation controller via the communication interface COM, operating unit or similar via the semiconductor switch HL/SSCB)=>contacts are closed=>release signal to semiconductor switch HL=>switches ON=>display of the semiconductor switch is switched on (ON) and also the handle of the isolating contact system KS is ON.

2. Operational switch-on, switch-off; logic sequence:
a) switch operating currents, disconnect small overcurrents, isolator is ON (closed).
Semiconductor switch switches according to requirement On or OFF=>no signal at the isolator for switch-off=>signal display of the semiconductor switch is On or OFF.
b) disconnect fault, which requires reliable isolation. Logic sequence:
Semiconductor switch disconnects=>switch-off signal to isolator=>isolator/isolating contact system KS opens contacts (switches OFF)=>isolator/isolating contact system KS is locked so that it is not possible to switch on again=>parallel signal to display unit AE of the semiconductor switch (and isolating contact system): OFF=>isolator switching position display in Tripped or OFF.

3. Switch-off, repair case; logic sequence:
The installation is disconnected by way of the semiconductor switch HL=>display for the semiconductor switch OFF=>suppress possible locking procedure for isolating contact system KS, =>isolating contact system KS can be opened (isolator can be switched off)=>switching position display isolating contact system OFF=>possible locking signal for semiconductor switch HL so that this cannot be switched on.

4. Switch-on after fault case; logic sequence:
Eliminate fault=>unlock isolator=>only able to be unlocked when semiconductor switch HL is high-impedance/OFF=>switch on isolator/isolating contact system KS after ON=>release signal to semiconductor switch HL=>semiconductor switch HL is able to be switched on.

Although at least one example embodiment has been illustrated and described in detail, the example embodiments are not limited by the disclosed examples and other variations can be derived therefrom by a person skilled in the art without departing from the scope of protection of example embodiments.

The invention claimed is:

1. A circuit breaker device for a low-voltage circuit, comprising in a housing:
   input-side first conductor connections for the low-voltage circuit, the input-side first conductor connections being connected to output-side second conductor connections via a series circuit, the series circuit including an isolating contact system and a semiconductor switch,
   a drive and an accessible handle on the housing,
   a display unit and an operating unit on the housing,
   a current sensor, the current sensor configured to determine a level of a current of the low-voltage circuit,
   a control unit, the control unit being connected to the current sensor, the display unit, the operating unit, the drive and the semiconductor switch, the control unit being configured to control the circuit breaker device such that, in a switch-on process, the isolating contact system is closed and a switching state of the semiconductor switch becomes a low impedance state, in a manual first switch-off process, the switching state of the semiconductor switch becomes a high impedance state and the isolating contact system remains closed, if a determined current exceeds a first current threshold value for a first time period, according to the first switch-off process, the switching state of the semiconductor switch becomes a high impedance state and the isolating contact system remains closed, if a determined current exceeds a second current threshold value for a second time period, for a second switch-off process, the switching state of the semiconductor switch becomes a high impedance state and then the isolating contact system is opened, and if a determined current exceeds a third current threshold value, according to the second switch-off process, the switching state of the semiconductor switch becomes a high impedance state and then the isolating contact system is opened.

2. The circuit breaker device as claimed in claim 1, wherein the isolating contact system is locked by a first locking procedure in a second switch-off process.

3. The circuit breaker device as claimed in claim 2, wherein an unlocking procedure of the first locking procedure of the isolating contact system is performed only when the switching state of the semiconductor switch is a high impedance state.

4. The circuit breaker device as claimed in claim 3, wherein in the switch-on process, after the switching state of the semiconductor switch becomes a low impedance state, a second locking procedure prevents manual opening of the isolating contact system.

5. The circuit breaker device as claimed in claim 1, characterized in that an opening of the isolating contact system occurs only when the switching state of the semiconductor switch is a high impedance state.

6. The circuit breaker device as claimed in claim 1, wherein it is possible to perform a differential current determination in the low-voltage circuit, in that a second switch-off process is carried out in the case of a differential current value that exceeds a residual current threshold value.

7. The circuit breaker device as claimed in claim 1, wherein a switch-on and switch-off process are initiated by the operating unit.

8. The circuit breaker device as claimed in claim 1, wherein the display unit displays the switching state of the semiconductor switch or/and a type of switch-off process.

9. The circuit breaker device as claimed in claim 1, wherein the handle displays a state of the isolating contact system.

10. The circuit breaker device as claimed in claim 9, wherein the display unit also displays the state of the isolating contact system.

11. The circuit breaker device as claimed in claim 1, wherein the drive is a motor drive, is a solenoid drive, or includes a spring energy store.

12. The circuit breaker device as claimed in claim 1, further comprising:
a communication interface connected to the control unit.

13. The circuit breaker device as claimed in claim 1, further comprising: a voltage sensor configured to determine a level of a voltage of the low-voltage circuit, the voltage sensor being connected to the control unit.

14. The circuit breaker device as claimed in claim 1, further comprising: a power supply unit, one side of the power supply unit is configured to draw energy from the low-voltage circuit and another side of the power supply unit is connected to the control unit.

15. The circuit breaker device as claimed in claim 1, wherein an auxiliary energy connection is provided to supply energy to the control unit.

16. The circuit breaker device as claimed in claim 1, wherein the display unit is an optical display unit including light-emitting diodes.

17. A circuit breaker system for a low-voltage circuit, having a first device comprising a semiconductor switch and a second device comprising an isolating contact system, connected to one another via a communication link, the circuit breaker system comprising:

a first device housing of the first device, the first device housing including, input-side first connections for the low-voltage circuit, the input-side first connections being connected to output-side second connections via the semiconductor switch, a current sensor, the current sensor configured to determine a level of a current of the low-voltage circuit, and a logic unit, the logic unit being connected to the semiconductor switch and the current sensor and which is connected to a first communication interface, the communication interface providing a connection for the communication link, a second device housing of the second device, the second device housing including, input-side third connections for the low-voltage circuit, the input-side third connections being connected to output-side fourth connections via an isolating contact system, a drive and an accessible handle for the isolating contact system, and a monitoring unit, the monitoring unit being connected to the drive and to a second communication interface, the second communication interface providing a connection for the communication link, the second connections being connected to the third connections via a line of the low-voltage circuit and the system being configured such that, in a switch-on process, the isolating contact system is closed and a switching state of the semiconductor switch becomes a low impedance state, in a manual first switch-off process, the switching state of the semiconductor switch becomes a high impedance state and the isolating contact system remains closed, if a determined current exceeds a first current threshold value for a first time period, according to the first switch-off process, the switching state of the semiconductor switch becomes a high impedance state and the isolating contact system remains closed, if a determined current exceeds a second current threshold value for a second time period, for a second switch-off process, the switching state of the semiconductor switch becomes a high impedance state and then the isolating contact system is opened, and if a determined current exceeds a third current threshold value, according to the second switch-off process, the switching state of the semiconductor switch becomes a high impedance state and then the isolating contact system is opened.

18. The circuit breaker system as claimed in claim 17, wherein the communication link is a wired communication link.

19. The circuit breaker system as claimed in claim 17, wherein the first device comprises a display unit and an operating unit on the first device housing, the operating unit is connected to the logic unit, and the second device comprises a further display or operating unit on the second device housing.

20. A device comprising a semiconductor switch as claimed in claim 17.

21. A device comprising an isolating contact system as claimed in claim 17.

22. A method for a circuit breaker device or circuit breaker system comprising a series circuit composed of a semiconductor switch and an isolating contact system for a low-voltage circuit, in which the level of the current is determined, the method comprising:

in a switch-on process, the isolating contact system is closed and a switching state of the semiconductor switch becomes a low impedance state, in a manual first switch-off process, the switching state of the semiconductor switch becomes a high impedance state and the isolating contact system remains closed, if a determined current exceeds a first current threshold value for a first time period, according to the first switch-off process, the switching state of the semiconductor switch becomes a high impedance state and the isolating contact system remains closed, if a determined current exceeds a second current threshold value for a second time period, for a second switch-off process, the switching state of the semiconductor switch becomes a high impedance state and then the isolating contact system is opened, and if a determined current exceeds a third current threshold value, according to the second switch-off process, the switching state of the semiconductor switch becomes a high impedance state and then the isolating contact system is opened.

\* \* \* \* \*